(No Model.) 2 Sheets—Sheet 1.

J. F. MUNSIE.
UNDERGROUND CONDUIT.

No. 426,197. Patented Apr. 22, 1890.

WITNESSES.
H. W. Elmore
W. L. Hillyer

INVENTOR.
James F. Munsie.
By his Attorney.

(No Model.) 2 Sheets—Sheet 2.
J. F. MUNSIE.
UNDERGROUND CONDUIT.
No. 426,197. Patented Apr. 22, 1890.
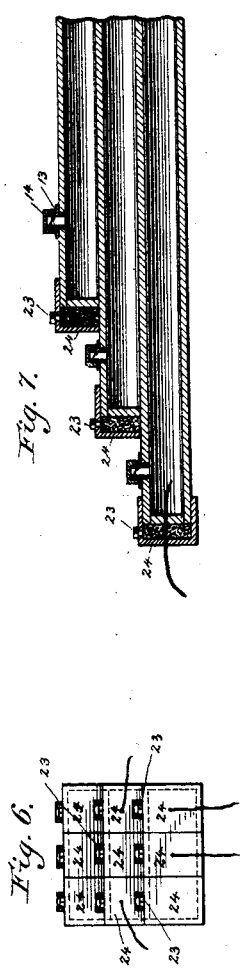
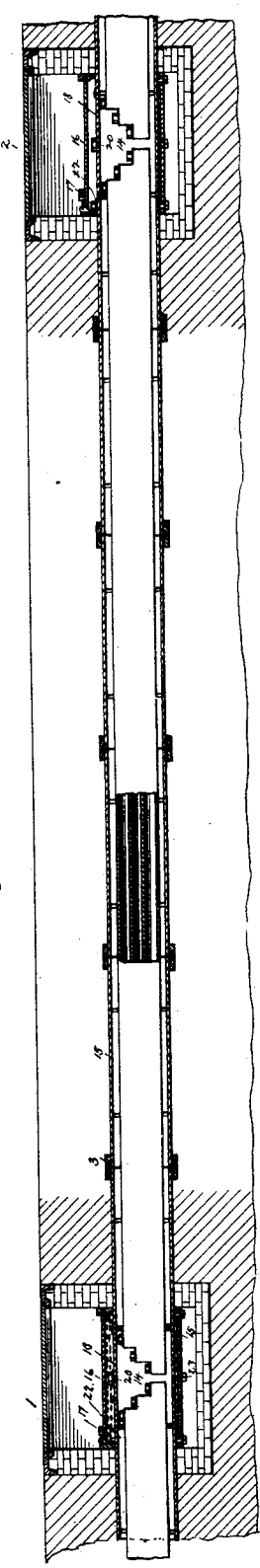
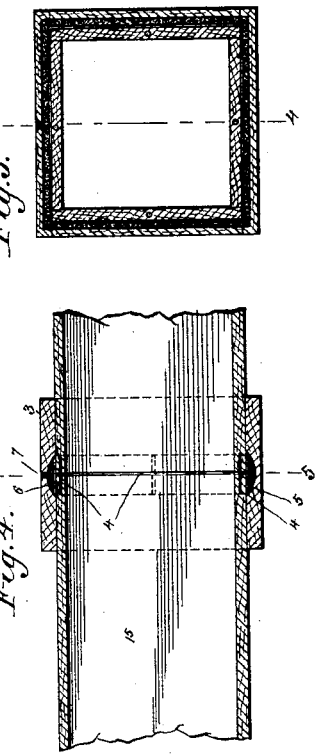
WITNESSES.
H. W. Elmore
W. L. Hillyer
INVENTOR.
James F. Munsie.
By his Attorney.

UNITED STATES PATENT OFFICE.

JAMES FERGUSON MUNSIE, OF CHICAGO, ILLINOIS, ASSIGNOR TO THOMAS L. COLES, OF NEW YORK, N. Y.

UNDERGROUND CONDUIT.

SPECIFICATION forming part of Letters Patent No. 426,197, dated April 22, 1890.

Application filed May 8, 1889. Serial No. 310,034. (No model.)

*To all whom it may concern:*

Be it known that I, JAMES FERGUSON MUNSIE, a subject of the Queen of Great Britain, residing at Chicago, in the county of Cook and State of Illinois, have invented certain new and useful Improvements in Underground Conduits; and I do hereby declare the following to be a full, clear, and exact description of the invention, such as will enable others skilled in the art to which it appertains to make and use the same.

My invention relates to certain new and useful improvements in underground conduits for electrical conductors, and has for its object to provide a conduit which shall be simple in construction, readily accessible for the insertion of the conducting wires or cables, economical in point of manufacture and installation, and which shall maintain its efficiency during long-continued use. In the attainment of these ends I have devised the construction and arrangement of parts illustrated in the accompanying drawings, wherein—

Figure 1:
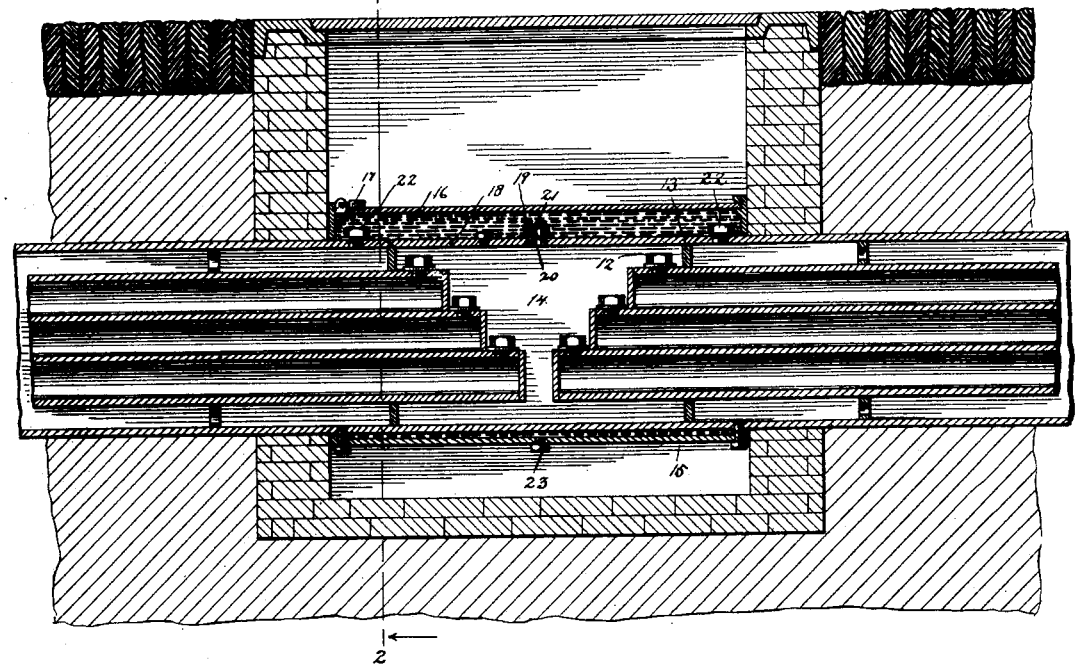
Figure 2:
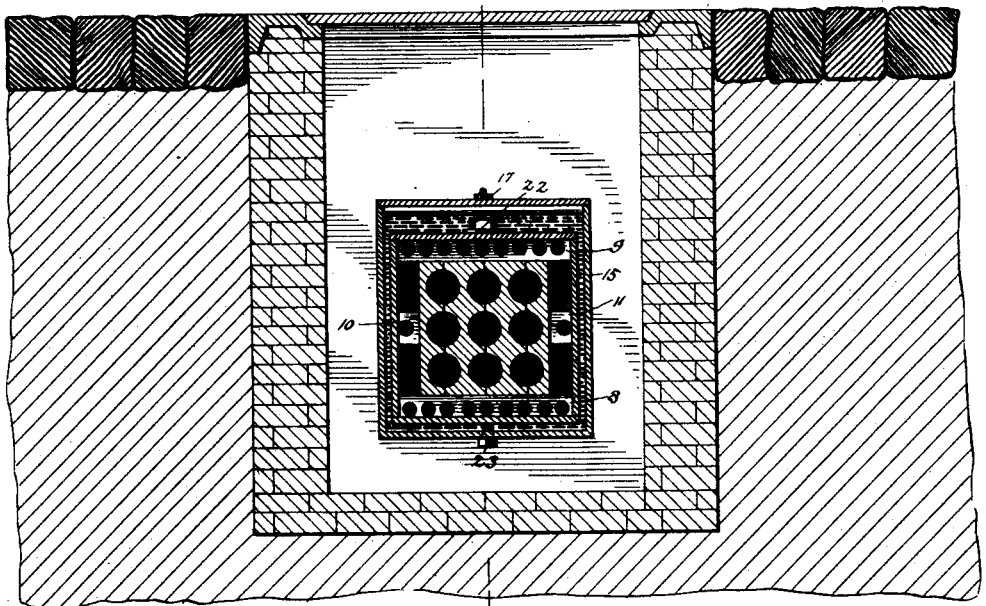

Figure 1 represents in longitudinal section a portion of my improved conduit and the man-hole used in connection therewith, the section being taken on a plane indicated by the line 1 1 of Fig. 2. Fig. 2 represents a cross-sectional view taken on a plane indicated by the line 2 2 of Fig. 1. Fig. 3 represents, partly in elevation and partly in section, one of the subdivisions of my improved conduit between adjacent man-holes. Figs. 4 and 5 represent detail views in longitudinal and transverse section, respectively, of a portion of the inclosing-casing or outside envelope of the conduit, illustrating more particularly the method of forming the joints therein; and Figs. 6 and 7 represent, respectively, an end elevation and a longitudinal section of my preferred form of wire-duct.

Similar numerals of reference indicate similar parts throughout the several views.

As represented more fully in Fig. 3, my improved conduit consists of a number of sections isolated from each other, each section extending between adjacent man-holes, as 1 2, which for purposes of convenience may be located at the intersection of cross-streets. The conduit is located at a distance below the surface of the ground beneath the ordinary frost limit, and is made up, primarily, between adjacent man-holes of an outer jacket or casing of any suitable cross-section, and consisting of a series of subdivisions abutting end to end, as shown in Figs. 3 and 4, the point of juncture being protected by an exterior sleeve 3, as shown in said figures. The subdivisions of the exterior casing are preferably made of wood impregnated with creosote, asphaltum, or the like, so as to be water-proof and not liable to decay. The abutting end surfaces are carefully fashioned off to fit accurately one against the other, and are connected by means of dowel-pins 4, of harder wood, so as to make a tight joint. About the dividing-line between the adjacent subdivisions is wrapped a sheet of water-proof paper, (tar-paper or the like,) and over the joint is slipped the retaining sleeve or cover 3, provided with an internal circumferential groove 6 and a filling-aperture 7, through which aperture a liquid composition, consisting of asphaltum, tar, or the like, may be inserted under pressure, so as to compress the paper 5 closely upon the pipe ends, the subsequent solidification of the liquid composition leaving the joint entirely water and air proof.

Within the external casing and separated therefrom by an intervening space is located the wire-conducting conduit proper, said conduit consisting of one or more ducts adapted for the reception of wires, and being held apart from the walls of the surrounding envelope by bottom blocks 8, top blocks 9, and side blocks 10 11, all of said blocks being preferably perforated, so as not to obstruct free communication between all parts of the intervening space above referred to. At each man-hole the said intervening space is closed at each end by the closing partition 12, said entire space between adjacent man-holes being therefore completely inclosed and isolated from contact with the external air and from communication with the interior of the inclosed duct or ducts.

In the form of my invention illustrated in the drawings the wire-ducts are composed of a series of blocks of wood or the like, provided with longitudinal semi-circumferential grooves registering with each other, as shown in Fig. 2, so as to make up a series of circular ducts, the inner surface of which is coated with a layer of fire-proof paint, so as to resist the heating effect due to the formation of an arc in the duct on the accidental rupture of one of the conductors, should such rupture take place, while the exterior surface of the duct or ducts is coated with a layer of water-proof material—such as asphaltum, tar, or the like—to act as an additional re-enforcement against the penetration of moisture from without. The exterior casing of the conduit is continued beyond the inner walls of the man-hole, as shown, the bottom and side partitions being carried across the man-hole and a section of the top being hinged at 13, as shown, so as to enable access from without to be had to the intermediate space 14 between the ends of the wire-ducts. Within the man-hole an additional casing 15 is built, surrounding the external casing of the conduit thereat, and said additional casing 15 is provided at the top with a door 16, adapted to be secured in place by a lock 17, so that the underground conduit shall, even at the man-hole, be secure from interference by meddlesome or malicious persons. The door 18 of the exterior envelope of the conduit is provided with a short tube or nipple 19, having an outwardly-opening valve 20, said nipple being adapted to be closed by a screw-cap 21, which is removable, so as to permit the attachment of an air-pump to the nipple 19, thereby permitting the exhaustion of the air from the space 14 after the cover 18 is closed. The space between the casing 15 and the outer walls of the exterior envelope of the conduit is adapted to be filled up by a non-congealable liquid—such as rosin-oil or the like—after the cover 18 shall have been closed.

It will be noted that in the arrangement illustrated in the drawings the ends of the ducts extend into the man-hole in a staggered position with respect to each other, this arrangement permitting each duct to be provided at its upper surface with a separate nipple and cap of the same character as that heretofore described with reference to the cover 18, and for a similar purpose—namely, to permit the exhaustion of the air from the ducts. A similar provision is made at 22 for the exhaustion of air from the space between the exterior envelope of the conduit and the exterior surface of the duct or ducts.

I prefer in most instances to supplement the ends of the several ducts with additional cap-pieces, as illustrated in Figs. 6 and 7 of the drawings, these cap-pieces corresponding to and fitting over the duct ends and being provided with apertures closable by plugs 23, through which a body of paraffine or other congealable water-proof substance may be forced, so as to be compressed tightly about the issuing wire or wires from the duct, thereby insuring the permanency of the vacuum in said duct, while permitting the wires to issue from the duct ends. It will be noted by reference to Fig. 6 that each of the cap-pieces 24 is separately removable without disturbing its neighbor, so that any particular duct may be operated upon by closing its end without interfering with its neighbor.

The parts being constructed and arranged as described, the operation of my invention is as follows: The exterior envelope or casing of the underground conduit having been located or installed in the ground in the manner described and the interior ducts inserted, the operator at the man-hole proceeds in any suitable manner to insert within one or more of the ducts the conducting-wires to be used for the two adjacent sections of the conduit. These wires project from the ends of the ducts, and the caps are then placed in position, the wires led through them, and the congealable water-proof material, as paraffine or the like, is forced through the openings in said caps by a suitable liquid force-pump, so as to compact said material firmly around the wires and hermetically seal the ends of the several ducts. The cap-pieces are then removed from the short tubes or nipples of the said ducts and from the short tube or nipple 22, and by means of an air-pump the air is withdrawn or exhausted from all of the ducts and from the space surrounding them. The operator then closes the door 18 and withdraws by means of the nipple 19 the air from the space 14, whereupon the cap-piece 21 is screwed on and rosin-oil or the like is poured into the casing 15, so as to completely surround that portion of the underground conduit which passes through the man-hole and cut off communication with the external air. The cover 16 is then lowered and secured in place by the lock 17. To gain access to the conduit at a subsequent time, the operator unscrews the plug 25, permitting the rosin-oil to be drawn off, whereupon the doors 16 and 18 are opened, thereby permitting any one of the ducts to be operated upon by the removal of its appropriate cap-piece without disturbing any one of the other ducts in the series and without admitting air into said ducts or into the space surrounding them. The appropriate manipulation having been gone through with in relation to any particular duct, its cap-piece is again replaced and the duct exhausted and the man-hole space closed as before. Should any accident happen whereby the integrity of the external envelope of the conduit is destroyed, the opening 22 affords a means of injecting into said space any appropriate liquid insulating material. I propose, however, to employ this expedient only in cases where some injury has happened to the exterior envelope of the conduit, as I prefer for general practice to avail myself of a vacuum within the space inclosed by said envelope.

Care must be taken during the installation of the conduit to tamp the surrounding body of earth firmly and compactly about the external surface of the outer envelope, so as to firmly and securely embed the conduit within the ground in such manner that it shall not be liable to be forced out of alignment by subsequent settling or by excavation going on near it.

Having thus described my invention, what I claim is—

1. An underground conduit consisting of a series of isolated sections, each section extending from one man-hole to an adjacent man-hole in the system, and provided with ducts containing electrical conductors extending through the opposite ends of said ducts, said ducts being hermetically sealed at both ends and provided with taps for the attachment of an exhaust-pump, substantially as and for the purposes described.

2. An underground conduit consisting of an exterior casing and an interior duct or ducts separated therefrom by an intervening space, said intervening space and the duct or ducts themselves being under exhaustion, substantially as described.

3. In an underground conduit, the combination, with a man-hole, of an external casing forming a part of said conduit and extending within the man-hole, and a duct or ducts projecting beyond said casing, each duct being provided with an air-exhaust port, substantially as described.

4. In an underground conduit, the combination, with a man-hole, of ducts extending within said man-hole in a staggered relation one to the other, each duct being provided with an air-exhaust port, substantially as described.

5. In an underground conduit, the combination, with a duct having its end perforated for the passage of a conducting-wire, of a cap fitting said end, said cap being provided with a filling-aperture, whereby a congealable water-proof liquid may be inserted, substantially as described.

6. In an underground conduit, the combination, with a duct, of an air-exhaust port therefor, consisting of a nipple, a valve within said nipple, and a removable cap, substantially as described.

7. In an underground conduit, an exterior casing consisting of a series of subdivisions having abutting ends connected by dowel-pins, a coating of paper surrounding said ends, and a sleeve having an internal circumferential groove and having a filling-aperture, whereby a congealable water-proof material may be forced within said groove, substantially as described.

8. In an underground conduit, the combination, with a man-hole, of ducts leading into said man-hole, an exterior casing having at the man-hole a hinged top, and a second casing adapted to contain a liquid, the ducts and the space about them being under exhaustion, substantially as described.

9. In an underground conduit, the combination, with a man-hole, of ducts extending within said man-hole, each duct being provided with an air-exhaust port, an exterior casing for said ducts, separated therefrom by an intervening space and extending within the man-hole, said casing being provided with an air-exhaust port, a door for said casing, said door being provided with an air-exhaust port, and a second casing surrounding the first within the man-hole and adapted to contain a liquid, substantially as described.

10. In an underground conduit, the combination, with a man-hole, of ducts extending within said man-hole, each duct being provided with an air-exhaust port, an exterior casing for said ducts, separated therefrom by an intervening space and extending within the man-hole, said casing being provided with an air-exhaust port, a door for said casing, said door being provided with an air-exhaust port, and a second casing surrounding the first within the man-hole and adapted to contain a liquid, said second casing being provided with a closing-door and an outlet-opening, substantially as described.

11. In an underground conduit, the combination, with a man-hole, of a series of ducts extending within said man-hole, each duct being provided with an air-exhaust port and with a separate cap-piece, said cap-piece having an opening for the insertion of a congealable liquid, substantially as described.

In testimony whereof I affix my signature in presence of two witnesses.

JAMES FERGUSON MUNSIE.

Witnesses:
 HERBERT MUNSIE,
 A. C. REYNOLDS.